US012131623B2

(12) United States Patent
Nalukurthy et al.

(10) Patent No.: US 12,131,623 B2
(45) Date of Patent: Oct. 29, 2024

(54) SYSTEMS, METHODS, AND PROCESSES OF PROVIDING FIRST RESPONDERS WITH LIVE CONTEXTUAL INFORMATION OF BUILDING DESTINATIONS FOR ENHANCED PUBLIC SAFETY OPERATIONS

(71) Applicant: Honeywell International Inc., Charlotte, NC (US)

(72) Inventors: Rajeshbabu Nalukurthy, Atlanta, GA (US); Sameer Agrawal, Weddington, NC (US); Andrew L. Macfarlane, Santa Barbara, CA (US); Udayabharathi Shrivastava, Snellville, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/867,146

(22) Filed: Jul. 18, 2022

(65) Prior Publication Data

US 2024/0021070 A1 Jan. 18, 2024

(51) Int. Cl.
*G08B 29/06* (2006.01)

(52) U.S. Cl.
CPC .................................... *G08B 29/06* (2013.01)

(58) Field of Classification Search
CPC .... G08B 25/004; G08B 27/00; G08B 25/014; H04L 45/22; H04L 12/66
See application file for complete search history.

(56) References Cited

U.S. PATENT DOCUMENTS 7,085,551 B1 8/2006 Bonner
10,140,839 B1 * 11/2018 Smith .................. G08B 25/001
10,713,127 B2 * 7/2020 Ramakrishnappa .......................... G06F 11/2002
11,145,186 B2 10/2021 De Blonde et al.
(Continued)

FOREIGN PATENT DOCUMENTS

CN 110956563 A 4/2020
WO 2005060301 6/2005
(Continued)

OTHER PUBLICATIONS

Holmberg , et al., "Building Tactical Information System for Public Safety Officials"; National Institute of Standards and Technology; (Jan. 2006) (67 pgs).

*Primary Examiner* — Mirza F Alam
(74) *Attorney, Agent, or Firm* — Brooks, Cameron & Huebsch, PLLC

(57) ABSTRACT

Devices, systems, and methods for providing first responders with contextual information of a facility having an alarm event for enhanced public safety operations are described herein. One system includes an alarm system control panel, multiple first communication paths for communicating information between the alarm system control panel and to both an alarm system monitoring station device and a mobile device having an alarm monitoring software application thereon, the alarm monitoring software application communicating via one of a second multiple of communication paths with a first responder device, and the alarm system monitoring station device also communicating via a different communication path with the first responder device.

20 Claims, 2 Drawing Sheets

(56) References Cited

U.S. PATENT DOCUMENTS

| | | | | |
|---|---|---|---|---|
| 2010/0205060 | A1* | 8/2010 | Athsani .............. | G01C 21/3484<br>705/14.58 |
| 2015/0015381 | A1 | 1/2015 | McNutt et al. | |
| 2015/0018987 | A1* | 1/2015 | Hederstierna ......... | H04W 12/50<br>700/90 |
| 2015/0161880 | A1* | 6/2015 | Hwang ............. | H04M 3/42059<br>340/508 |

FOREIGN PATENT DOCUMENTS

| | | | |
|---|---|---|---|
| WO | 2012117364 | | 9/2012 |
| WO | 2018160961 | A1 | 9/2018 |
| WO | 2019095187 | A1 | 5/2019 |

* cited by examiner

SYSTEMS, METHODS, AND PROCESSES OF PROVIDING FIRST RESPONDERS WITH LIVE CONTEXTUAL INFORMATION OF BUILDING DESTINATIONS FOR ENHANCED PUBLIC SAFETY OPERATIONS

TECHNICAL FIELD

The present disclosure relates to systems, methods, and processes of providing first responders with live contextual information of building destinations for enhanced public safety operations.

BACKGROUND

In the world of life safety at facilities, a safety operation starts with indications from sensors detecting an emergency event at a facility, such as a building, and the alarm system sending these indications to initiate an alarm to which emergency response personnel, such as fire fighters, respond to the building to address the event. When the system is monitoring the facility and such an emergency event (e.g., fire, security, chemical spill, etc.) occurs, there are multiple stake holders, such as the building occupants, building manager, building owner, alarm system monitoring personnel, and/or emergency response personnel.

In conjunction with these stake holders there are methods and processes that may be in use to communicate information to, from, and between these stake holders. Currently, some information is not available and these communication mechanisms are also disconnected and the information that is available is not shared between all stake holders. Accordingly, there is a lot of information loss that happens and a lot of lost opportunities to generate and provide synergistic information based on the information known to these various stake holders before the information reaches its final destination.

DETAILED DESCRIPTION

Figure 1:
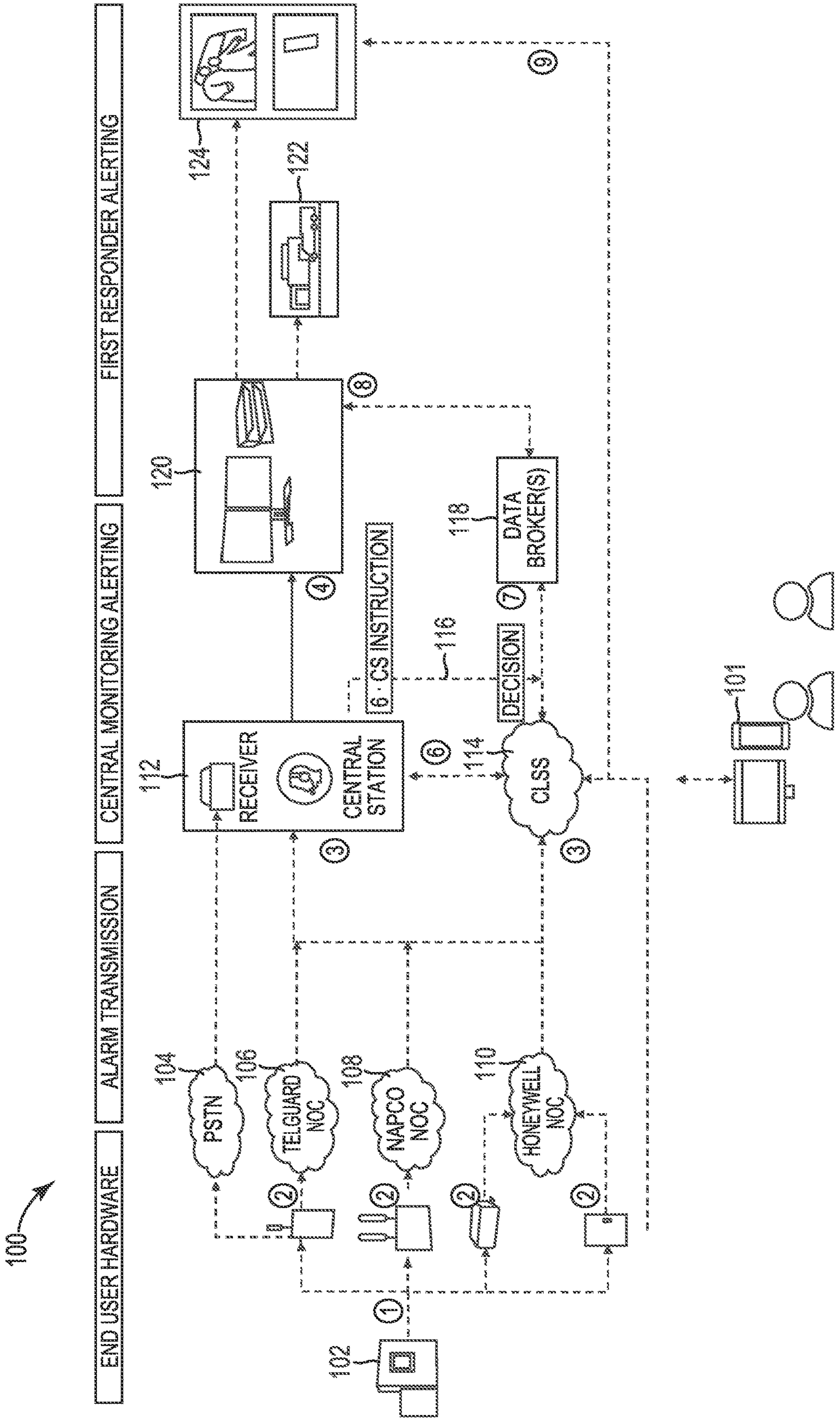
FIG. 1 is an example of an event alarm system in accordance with one or more embodiments of the present disclosure.

Recent technological trends have enabled the stake holders in the typical emergency event systems to be better connected than ever before. Through these advancements and with implementation of embodiments of the present disclosure new capabilities can be enabled to allow connections in a virtual world and provide interesting opportunities to enhance the stake holder experience during emergencies to enhance public safety.

Devices, systems, and methods for providing first responders with contextual information of a facility having an alarm event for enhanced public safety operations are described herein. One system includes an alarm system control panel, multiple first communication paths for communicating information between the alarm system control panel and to both an alarm system monitoring station device and a mobile device having an alarm monitoring software application thereon, the alarm monitoring software application communicating via one of a second multiple of communication paths with a first responder device, and the alarm system monitoring station device also communicating via a different communication path with the first responder device.

In the embodiments of the present disclosure methods, systems, and processes are disclosed that can be followed for effective public safety management during critical times. These embodiments will help all stake holders in the web of interconnected system communication get comprehensive contextual progressive information from the time an event is detected by a sensor in the building to the time the event is concluded.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of an event alarm system in accordance with one or more embodiments of the present disclosure. In the embodiment of FIG. 1, the system 100 includes an alarm system control panel 102 (e.g., fire system control panel located at a facility being monitored for events and connected to a number of alarm system event sensing devices). The alarm system control panel receives indications of an event sensed by the alarm system devices of an alarm system of a facility. For example, a fire system control panel can receive an indication from a sensor within a smoke detector device, a sensor within a fire detector device, or an activation of a pull station device (these are all examples of event sensing devices) that a fire event is occurring at an area near the event sensing device that is providing the indication of an event.

The alarm system control panel can communicate information about the event through one or more first communication paths to one or more remote devices. As used herein, a remote device is located remote from the building or accessed by a communication path that is not a part of the local network that connects the alarm system devices to the alarm system control panel (e.g., a technician or first responder may be on premise, but is considered a non-local device).

Examples of communication paths are shown in FIG. 1 and include, but are not limited to, a public switched telephone network path 104, a first proprietary network 106 (i.e., network communication path communicating using a proprietary software code from a manufacturer that is not the alarm system panel manufacturer), a second proprietary network 108 (there could be more or less proprietary network paths, and one or more communication paths 110 (e.g., via a pathway through a network device with communication functionality or a network gateway type device) that communicate using the proprietary network software code used by the alarm system panel manufacturer.

As illustrated in the example embodiment of FIG. 1, the control panel can use any of these paths to communicate with an alarm system monitoring station device 112, at an alarm system monitoring station, and an alarm monitoring software application 114, on one or more facility personnel devices 101 (e.g., of a facility manager, facility owner, or on-site contact person). These multiple communication paths can also provide redundancy making the communication between the alarm system control panel 102 and/or the alarm system monitoring station device 112 and/or the alarm monitoring software application 114 more reliable.

To alert emergency response personnel to the occurrence of the event and initiate a response (e.g., roll a fire truck toward the facility), the personnel at the alarm system monitoring station can send information about the event, via the alarm system monitoring station device 112, directly to a first responder device, such as a mobile device, or, as shown in FIG. 1, to a station alerting gateway device 120. The station alerting gateway device can, for example, be a computing device having a digital signal receiver and/or a computer aided drafting capability. The station alerting gateway device can, for example, be located at a public safety answering point (PSAP) location or 911 dispatch location.

This communication can be a direct second communication path between the alarm system monitoring station device 112 and the station alerting gateway device 120 (e.g., via a manual dial-out voice communication path) and/or through an indirect second a contextual information communication path 116 with access to a data store 118 (e.g., on a cloud server) that can store the communication and then share the communication at the request of the alarm system monitoring station personnel. This also provides a redundant communication path to allow for more reliable communication between the alarm system monitoring station device 112 and the station alerting gateway device 120 as well as allowing for robust contextual data to be provided from the data store or other locations connected to this communication path. In some embodiments, the manual dial-out voice communication path can be an analog path and the contextual information communication path can be a digital communication path.

The data store can also aggregate data from a variety of sources that each have different data sets. For example, data can be received by the alarm monitoring software application 114 or received by the data store 118 and then stored (e.g., automatically via executable instructions or by user input) in the data store 118. The data can be received from at least one of: the alarm system control panel 102, the alarm system monitoring station device 112, the station alerting gateway device 120, facility personnel devices 101, devices used by an emergency response team 122, non-local network resources, and/or the first responder devices 124.

This aggregated data set can be used synergistically to create other useful data sets. For example, traffic data from a non-network resource can be combined with facility map data from the alarm system control panel 102 to update a route to the facility. In another example, multiple event indications from the alarm system control panel 102 can be analyzed chronologically to determine a path of the event within the facility and this data can be combined with facility map data from the alarm system control panel 102 to route emergency response personnel from entering an area where the event is spreading to or has already spread to.

Further, the second multiple of communication paths can, for example, include a contextual information communication path that carries information obtained and stored in the data store during installation, commissioning, and/or maintenance of the system (e.g., from the alarm system control panel). The information can, for instance, be facility address information, description of the arrival point at the facility, arrival point label, control panel information (e.g., location of panel, system service information, panel test/active/alarm status), etc.

As discussed above, the information can also include real-time status information. This can be received from either the alarm system control panel (new event indications, for example, indicating a fire is spreading to other areas), an on-site contact's device (e.g., updated description of the scene around the facility, missing facility occupant numbers based on a muster process, unlocked access points, etc.), and/or a non-local network resource, such as a device that provides traffic information or weather information. This information can, for example, be accessed by or via the alarm monitoring software application 114.

The station alerting gateway device 120 can, then, forward the communication to the appropriate emergency response personnel. For example, the station alerting gateway device 120 can communicate the information to a device used by an emergency response team 122, such as at a fire station, and/or to devices 124 used by individual first responders.

The embodiments of the present disclosure are primarily focused on aspects of the unique communication path afforded by the use of the alarm monitoring software application 114 which was not part of prior art systems. Traditionally, when an event indication is provided to the first responder mobile device it is communicated from the alarm system control panel via the PSTN (an analog path) communication path to the alarm system monitoring station device, and then through the station alerting gateway device. This substantially slows the flow of information to the first responder, introduces the possibility of human error in communicating the information, and increases the potential for the information not to be received by the first responder due to lack of communication path redundancy. It also cannot provide the contextual information discussed herein and accomplished by embodiments of the present disclosure.

The system embodiment of FIG. 1 also allows information to be passed directly to the first responders. For example, the first responders may want more information about the facility they are on their way to and the alarm system control panel 102 and/or facility personnel devices 101 can be requested to send that information via a particular communication path (e.g., 110, as illustrated in FIG. 1).

Figures 2A, 2B:
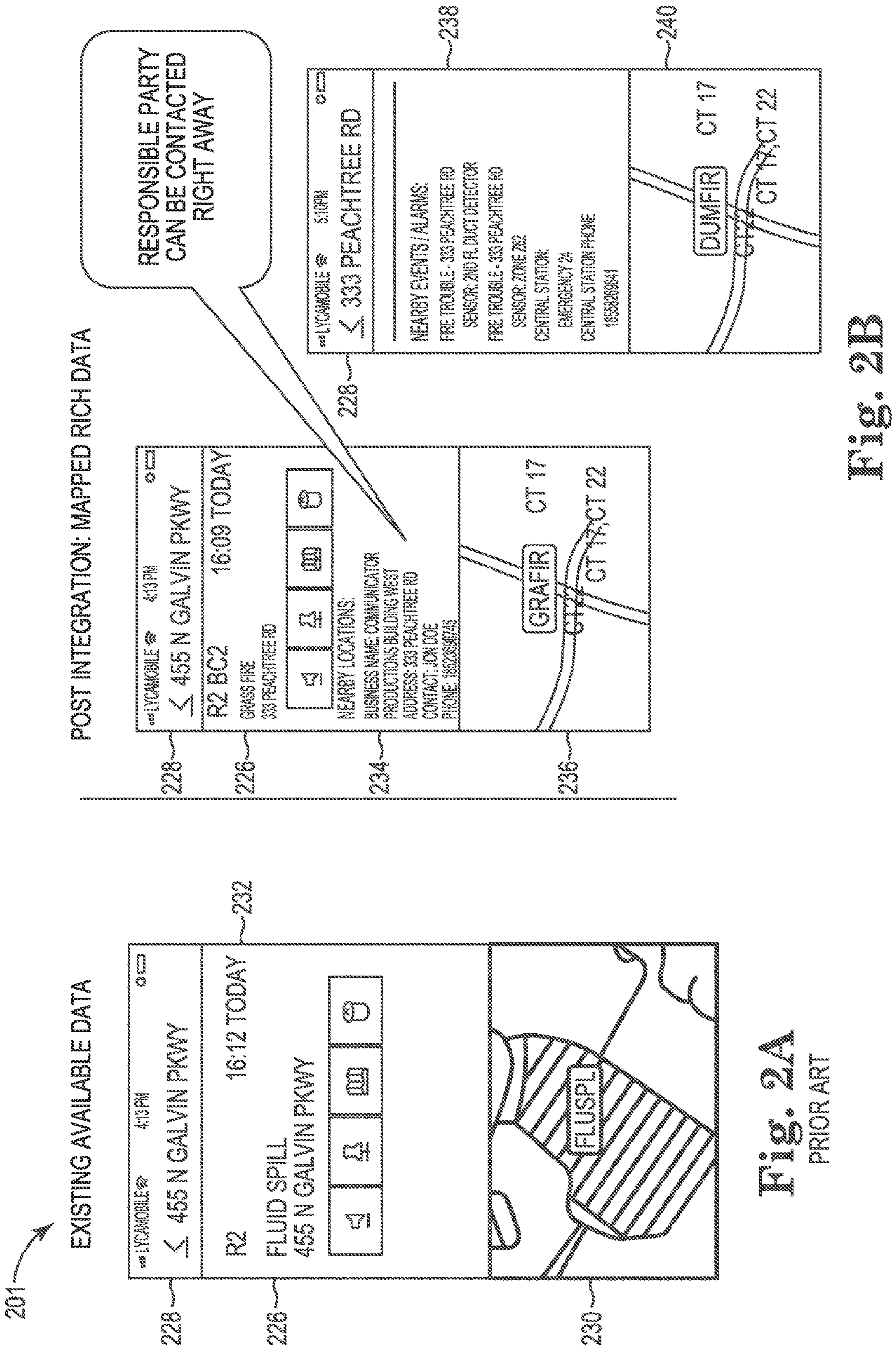
Fig. 2A PRIOR ART
FIG. 2A is an example of a prior art display of event information.
FIG. 2B is an example of a display of event information in accordance with one or more embodiments of the present disclosure.

FIG. 2A is an example of a prior art display of event information. In traditional emergency response systems 201 only the date/time of the notification that an event is occurring 232, the location of the event (in text 228 and/or sometimes geographical location map form 230), and sometimes the type of event 226 is provided to the first responder via a mobile device and communicated from the alarm system control panel via the PSTN communication path to the alarm system monitoring station device 112, and then through the station alerting gateway device 120.

FIG. 2B is an example of a display of event information in accordance with one or more embodiments of the present disclosure. In the embodiments of the present disclosure, a much more robust contextual data set can be provided to the first responders. In the embodiment of FIGS. 2A and 2B, the prior art information is a first screen on a display of a device used by a first responder. In that screen 201, they are alerted to a fluid spill at 455 Galvin Pkwy at 16:12 (information provided at 226, 228, and 232.

In this embodiment, the first responder also receives information about other past or current events in the area. For example, there was also an alert of a grassfire event 226 at 16:09. The complete building name and address are listed at 234 along with the contact information for someone associated with the building. This information allows the emergency responder to find out information about the building before they arrive at the facility, as traditionally a lot of time was lost at the facility finding the on-site contact and talking with them to get, for example, useful information for accessing the building (e.g., fastest route to event source through the building, doors that are accessible, potential hazards inside, etc.).

Based on latitude/longitude information, a more accurate map 236 is provided. This information or other location information can be used to identify other current of past events in the area. This analysis identifies that there are also fire events occurring nearby 238.

Here, first responders from Central Station have already been dispatched. They are identified as emergency response team 24 and their contact phone number is provided to allow the present first responders to contact the emergency response team 24 to coordinate with their efforts or alert them to the event that the present first responders are headed to. The display also provides a map of the location of the other events 240, so the first responder can understand the proximity of the events in the area, among other functions of such data.

As discussed previously, all of the information from FIG. 2A is still available in the embodiment of FIG. 2B, but other contextual data can be available, such as those items mentioned in other areas of the specification as well as: a complete building address, configured alarm system monitoring station details, contact information for relevant parties (e.g., facility owner, facility manager, alarm system monitoring personnel, on-site contact person, etc.), active events near to the event that has been communicated to the first responders (e.g., fire at an electrical substation at the facility that also has a building on fire), inspection information (e.g., device and/or system repair and/or service records), recent events near to the event that has been communicated to the first responders, point type, description of the event (e.g., from an on-site contact device), floor plan (e.g., CAD schematic and/or building information management documentation), fire spread potential (e.g., calculated via synergistic data analysis), fire spread update (e.g., from an on-site contact device and/or calculated via synergistic data analysis from alarm system control panel data), latitude/longitude data, alarm system device location for device indicating the event, a voice and/or text description of the building (e.g., from an on-site contact device), source of the event, an audio file, facility owner/manager/contact identifier, facility owner/manager/contact contact information and/or radio channel to be used by emergency personnel can also be communicated. This information can, for example, be stored in the data store 118.

This information can be provided by the alarm system control panel 102, from personnel at the alarm system monitoring station via the alarm system monitoring station device 112, and/or by facility owners and/or managers and/or on-site contacts via their devices 101. Such information can include real time updates from the facility area that can help the first responders plan for what the situation will be when they arrive. Some such information can be provided to the system from outside of the system 100. For example, weather or real time traffic updates for potential routes to the facility. Such information can also be helpful in assessing what type of equipment the first responders should bring (e.g., special equipment for a chemical fire). In formation can also include equipment at the facility that can assist in resolving the event. For example, location of controls for devices that can be used to vent smoke, controls to fire suppression equipment, etc.

Devices 101, 102, 112, 118, 120, 122, and/or 124 can include a processor and memory and can execute instructions via the processor that are stored in the memory to provide various functions of the devices described herein.

The remote computing device 101 can be, for example, a mobile device that is used by a technician within the building and communicates, at least in part, through a gateway device of the local alarm system control panel. The remote device 101 can also be a computing device at a remote alarm system monitoring location wherein one or more alarm systems are monitored for alarms and are tasked with coordinating a response to the alarm (e.g., coordinating first responders, contacting building owner/management, etc.).

The memory can be any type of storage medium that can be accessed by the processor to perform various examples of the present disclosure. For example, the memory can be a non-transitory computer readable medium having computer readable instructions (e.g., executable instructions/computer program instructions) stored thereon that are executable by the processor for event device maintenance in accordance with the present disclosure. The computer readable instructions can be executable by the processor to provide the initiation of an emergency response as described herein.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within the smoke detector device, embodiments of the present disclosure are not so limited. For example, memory can also be located internal to another computing resource (e.g., enabling computer readable instructions to be downloaded over the Internet or another wired or wireless connection).

As discussed above, a user (e.g., operator) can interact with the alarm system devices and/or first responders via user interface, such as that shown in FIG. 2B. For example, a user interface can provide (e.g., display and/or present) information to the user, and/or receive information from (e.g., input by) the user. For instance, in some embodiments, user interface can be a graphical user interface (GUI) that can provide and/or receive information to and/or from the user.

The display can be, for instance, a touch-screen (e.g., the GUI can include touch-screen capabilities). Alternatively, a display can include a television, computer monitor, mobile device screen, other type of display device, or any combination thereof, connected to the computing device and configured to receive a video signal output.

In some embodiments, the processor and memory can be in the form of a controller that controls a number of functions of the event sensing functionality and/or reporting of information to initiate and event response or update information about the event. For example, the controller can execute instructions with the processor that are stored in memory to receive data regarding whether an event is occurring.

As an additional example, user interface can include a keyboard and/or mouse the user can use to input information. Embodiments of the present disclosure, however, are not limited to a particular type(s) of user interface.

The embodiments of the present disclosure reduce the amount of calls to the alarm system monitoring station because the alarm system control panel and the first responders can pass information through communication paths that bypass alarm system monitoring station. Such embodiments can, for example, reduce human error and lower servicing cost at the alarm system monitoring station, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for providing first responders with contextual information of a facility having an alarm event for enhanced public safety operations, comprising:

an alarm system control panel;

multiple first communication paths communicating information between the alarm system control panel and to both an alarm system monitoring station device and a mobile device having an alarm monitoring software application thereon;

the alarm monitoring software application communicating via one of a second multiple of communication paths with a first responder device, wherein the second multiple of communication paths have access to a data store for storing a communication having the contextual information therein and then sharing the communication based on a request received from the alarm system monitoring station device; and the alarm system monitoring station device communicating via a different communication path with the first responder device.

2. The system of claim 1, wherein the multiple first communication paths are selected from the group including: a public switched telephone network path, a network communication path communicating using a proprietary software code, and a communication path that communicate using the proprietary network software code used by the alarm system panel manufacturer.

3. The system of claim 1, wherein the second multiple of communication paths include a direct second communication path between the alarm system monitoring station device and the station alerting gateway device and an indirect second communication path between the alarm system monitoring station device and the station alerting gateway device.

4. The system of claim 1, wherein the direct second communication path is a manual dial-out voice communication path.

5. The system of claim 1, wherein the second multiple of communication paths include a manual dial-out voice communication path and a contextual information communication path.

6. The system of claim 1, wherein the second multiple of communication paths include a contextual information communication path that carries information obtained and stored in the data store during installation of the system.

7. The system of claim 1, wherein the second multiple of communication paths include a contextual information communication path that carries real-time status information.

8. The system of claim 1, wherein the second multiple of communication paths includes analog and digital communication paths.

9. A system for providing first responders with contextual information of a facility having an alarm event for enhanced public safety operations, comprising:

an alarm system control panel communicatingly connected to a number of alarm system devices;

multiple first communication paths communicating information between the alarm system control panel and to both an alarm system monitoring station device and a mobile device having an alarm monitoring software application thereon;

the alarm monitoring software application communicating via one of a second multiple of communication paths with a first responder device, wherein the second multiple of communication paths have access to a data store for storing a communication having the contextual information therein and then sharing the communication based on a request received from the alarm system monitoring station device; and the alarm system monitoring station device communicating via a different communication path with the first responder device.

10. The system of claim 9, wherein the system further includes a controller that receives sensor data from the sensor and analyzes the data to determine whether smoke or self-test particles are present in the smoke detecting chamber.

11. The system of claim 9, wherein the second multiple of communication paths include a contextual information communication path.

12. The system of claim 11, wherein the contextual information communication path that carries information obtained and stored in the data store during at least one of installation, commissioning, and maintenance of the system.

13. The system of claim 12, wherein the information obtained and stored in the data store was obtained from the alarm system control panel.

14. The system of claim 9, wherein the information obtained and stored in the data store was obtained from a non-local network resource.

15. A method for providing first responders with contextual information of a facility having an alarm event for enhanced public safety operations, comprising:

an alarm system control panel;

communicating information via one of multiple first communication paths between the alarm system control panel and to both an alarm system monitoring station device and a mobile device having an alarm monitoring software application thereon;

communicating via the alarm monitoring software application through one of a second multiple of communication paths with a first responder device, wherein the second multiple of communication paths have access to a data store for storing a communication having the contextual information therein and then sharing the communication based on a request received from the alarm system monitoring station device; and communicating via a different communication path from the alarm system monitoring station device to the first responder device.

16. The method of claim 15, wherein communicating via the alarm monitoring software application includes communicating real-time status information.

17. The method of claim 16, wherein communicating real-time status information includes information received from the alarm system control panel.

18. The method of claim 16, wherein communicating real-time status information includes information received from an on-site contact's device.

19. The method of claim 16, wherein communicating real-time status information includes information received from a non-local network resource.

20. The method of claim 16, wherein communicating real-time status information includes at least one of traffic information or weather information.

* * * * *